US006483998B2

(12) United States Patent
Tanaka et al.

(10) Patent No.: US 6,483,998 B2
(45) Date of Patent: Nov. 19, 2002

(54) ELECTROSTATIC IMAGE-FORMING APPARATUS CONTROLLED TO COMPENSATE FOR FILM THINNING

(75) Inventors: Nariaki Tanaka, Osaka (JP); Hiroaki Shiba, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 09/878,422

(22) Filed: Jun. 12, 2001

(65) Prior Publication Data

US 2002/0021912 A1 Feb. 21, 2002

(30) Foreign Application Priority Data

Jun. 30, 2000 (JP) ....................................... 2000-199219

(51) Int. Cl.[7] ........................... G03G 15/00; H04N 1/10
(52) U.S. Cl. ............................ 399/46; 347/132; 399/43
(58) Field of Search ............................. 399/43, 46, 50, 399/51, 55, 130; 347/129, 132, 133, 140

(56) References Cited

U.S. PATENT DOCUMENTS 5,367,361 A * 11/1994 Henderson ................... 399/31

FOREIGN PATENT DOCUMENTS

| | | |
|---|---|---|
| JP | 7-333949 | * 12/1995 |
| JP | 8-106204 | * 4/1996 |
| JP | 10-246994 | * 9/1998 |

* cited by examiner

*Primary Examiner*—Joan Pendegrass
(74) *Attorney, Agent, or Firm*—Sherman & Shalloway

(57) ABSTRACT

An image-forming apparatus for forming an image by electrically charging a photosensitive material, forming an electrostatic image through the exposure to light and developing the electrostatic image, wherein the main charged potential, Vo, of the photosensitive material, the potential, Vr, of the exposed portion of the photosensitive material and the developing bias potential DB are so set as to satisfy the following formulas, $$V1 \leqq |DB-Vr| \leqq V2 \quad (1)$$

$$V3 \leqq |Vo-DB| \leqq 300 \quad (2).$$

V1, V2 and V3 are parameters calculated from a developing characteristics curve obtained by plotting the image densities to a potential difference between the developing bias potential and the surface potential, 0 V, of the photosensitive material when the image is formed by changing the developing bias potential with the exposure amount being zero in a state where the potential on the surface of the photosensitive material is maintained at zero.

6 Claims, 7 Drawing Sheets

ELECTROSTATIC IMAGE-FORMING APPARATUS CONTROLLED TO COMPENSATE FOR FILM THINNING

BACKGROUND OF THE INVENTION

1. Field of the Invention

The present invention relates to an image-forming apparatus used for copiers, printers and facsimiles. More specifically, the invention relates to an image-forming apparatus capable of obtaining images of suitable densities even when the thickness of the photosensitive material is decreased due to abrasion of the film yet saving the consumption of the toner.

2. Description of the Prior Art

In general, photoattenuation characteristics of the electrophotographic photosensitive materials are dependent upon the thickness of the film. That is, the thickness of a photosensitive material and, particularly, of an organic photosensitive material decreases with an increase in the frequency of use as the film is gradually abraded, and the potential (Vr) at the exposed portion changes (generally, increases) as the thickness of the film decreases. When the photosensitive material is used for extended periods of time, therefore, the potential at the exposed portion changes to such an extent that the image is no longer properly obtained.

In the conventional image-forming apparatuses, therefore, attempts have been made to extend the life of the photosensitive material by such means as correcting the exposure amount depending upon the abrasion of the film.

However, the dependence of potential of the exposed portion of the photosensitive material upon the thickness of the film is not necessarily monotonous; e.g., some photosensitive materials exhibit the potential at the exposed portion that change linearly depending upon the thickness of the film, and some photosensitive materials exhibit the potential at the exposed portion that so changes as to possess a minimum value depending upon the thickness of the film. Therefore, means for correcting the exposure amount must be changed depending upon the properties of the photosensitive material that is used. It is, however, very difficult to bring the control means into match with the properties of the photosensitive material to a sufficient degree.

According to the conventional systems as described above, it is difficult to maintain the potential of the exposed portion to lie within a predetermined range over a wide range of the thickness of the film. Even though obtaining the favorable image can be extended to some extent, the photosensitive material must be renewed after the use of relatively short periods of time, which is not still satisfactory from the standpoint of maintenance and cost.

SUMMARY OF THE INVENTION

It is therefore an object of the present invention to provide an image-forming apparatus in which the potential of the exposed portion of the photosensitive material varies within a narrow range depending upon the thickness of the film, the photosensivitive material can be used over a wide range of the thickness of the film without substantially causing a drop in the image density without using cumbersome means such as correcting the exposure amount, and which saves the consumption of the toner as compared at a predetermined image density.

According to the present invention, there is provided an image-forming apparatus for forming an image by electrically charging a photosensitive material, forming an electrostatic image through the exposure to light and developing the electrostatic image, wherein the main charged potential (Vo) of the photosensitive material, the potential (Vr) of the exposed portion of the photosensitive material and the developing bias potential (DB) are so set as to satisfy the following formulas (1) and (2), $$V1 \leq |DB - Vr| \leq V2 \quad (1)$$

$$V3 \leq |Vo - DB| 300 \quad (2)$$

wherein V1, V2 and V3 are parameters calculated from a developing characteristics curve obtained by plotting the image densities to a potential difference between the developing bias potential and the surface potential (0 V) of the photosensitive material of when the image is formed by changing the developing bias potential with the exposure amount being zero in a state where the potential on the surface of the photosensitive material is maintained at zero, V1 being a potential difference (absolute value) at a point at where an approximated straight line A in a region where the image density linearly increases intersects an approximated straight line B in a region where the image density increases to its saturation on the developing characteristics curve;

V2 being a potential difference (absolute value) at a point at where the approximated straight line B separates away from the developing characteristics curve; and V3 being a potential difference (absolute value) at a point at where the image density exhibits a value of (base paper density +0.005).

In the image-forming apparatus of the present invention, it is desired that:

1. The main charging potential (Vo) of the photosensitive material and the developing bias potential (DB) are so set as to satisfy the following formula (2'), $$V3 + 50 \leq |Vo - DB| \leq 250 \quad (2')$$

2. The exposure amount of the exposure device for irradiating the photosensitive material with light is set to be from 3 times to 10 times as large and, preferably, from 4 times to 6 times as large as the half exposure amount of the photosensitive material;
3. The photosensitive material is an organic photosensitive material containing a charge-generating agent and a charge-transporting agent; and
4. The developing is effected by the reversal developing system by using a two-component developing agent.

DETAILED DESCRIPTION OF THE INVENTION

In the image-forming apparatus of the present invention, the image is formed by electrically charging the photosensitive material, forming an electrostatic image through the exposure, and developing the electrostatic image. Here, the invention has a feature in that the main charged potential (Vo) of the photosensitive material, the potential (Vr) of the exposed portion of the photosensitive material and the developing bias potential (DB) are so set as to satisfy the above-mentioned formulas (1) and (2). This makes it possible to use the photosensitive material for extended periods of time over a wide range of thickness of the film irrespective of a decrease in the thickness of the film caused by the abrasion of the film and without requiring cumbersome means such as correcting the exposure amount, and to stably form the image of a high density while suppressing the consumption of the toner as compared at a predetermined image density.

The parameters V1, V2 and V3 of the formulas (1) and (2) are calculated from a developing characteristics curve that is obtained by plotting the image densities to the potential difference between the developing bias potential and the potential (0 V) on the surface of the photosensitive material of when the image is formed by changing the developing bias potential with the exposure amount being zero in a state where the surface of the photosensitive material is held at a potential of 0 V. The developing bias potential stands for a potential of a developer (developing sleeve) which is so provided as to be opposed to the photosensitive material.

Figure 1:
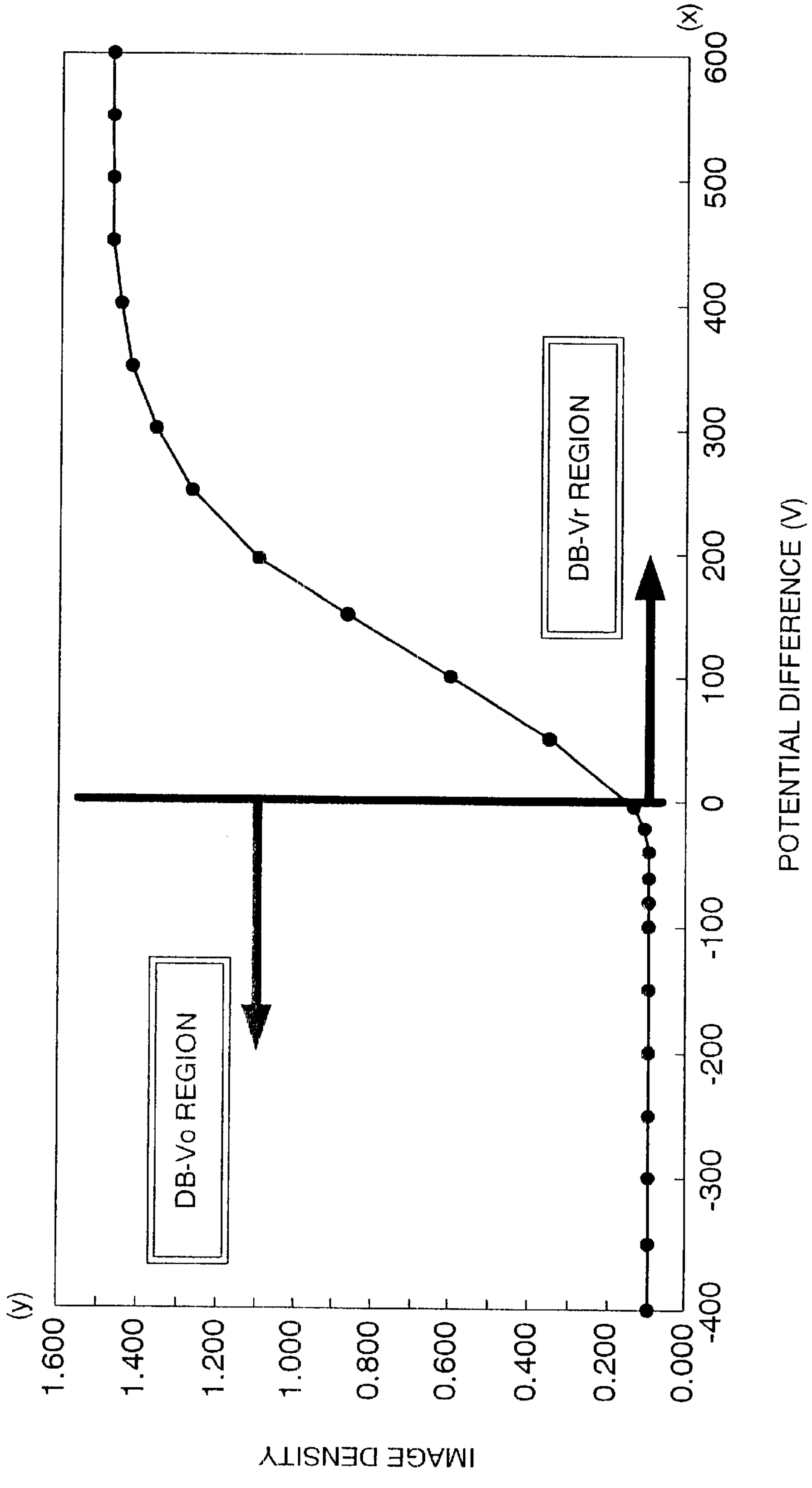
FIG. 1 is a graph illustrating a developing characteristics curve of an image-forming apparatus fabricated according to the present invention.

FIG. 1 shows a developing characteristics curve of the image-forming apparatus of the present invention, wherein the image density is measured by holding the potential of a positively charged organic photosensitive material at zero volt, increasing and decreasing the developing bias potential with respect to the surface potential (0 V) of the photosensitive material, and developing the image by using a positively charged toner by utilizing a potential difference between the developing bias potential and the potential on the surface of the photosensitive material. In FIG. 1, the abscissa (x-axis) represents the potential difference between the potential on the surface of the photosensitive material and the developing bias potential, and the ordinate (y-axis) represents the image density.

In the practical image-forming process in which the surface of the photosensitive material is electrically charged to a predetermined potential (Vo) and, then, the developing bias voltage is applied after the exposure to image-bearing light to form the image, the region of the plus side of the abscissa of FIG. 1 represents the toner image-forming region (portion exposed to light). That is, in FIG. 1, the abscissa of the plus side represents the potential difference (DB−Vr) between the developing bias potential (DB) and the potential (Vr) of the exposed portion.

On the other hand, the background region in the practical image-forming process corresponds to the region of the minus side of the abscissa of FIG. 1. That is, in FIG. 1, the abscissa of the minus side represents the potential difference (DB−Vo) between the developing bias potential (DB) and the charged potential (Vo) of the photosensitive material in the non-exposed portion. The image density in this region is a fogging density (image density in the non-exposed portion).

The plus region will be described first The image density increases with an increase in the potential difference (DB−Vr), and a favorable image is obtained. At first, the image density linearly increases relative to the potential difference but tends to be saturated on the way of the rise.

In the saturated region, the image density does not change so much no matter how greatly the potential difference is increased. From the standpoint of obtaining a high image density, it is not much meaningful to set the potential difference to the considerably right side in the saturated region. Rather, setting the potential difference to the considerably right side of the saturated region brings about such an inconvenience that the toner is consumed in an increased amount though the image density does not increase so much. Further, to sufficiently expand the potential difference (DB−Vr), the charged potential (Vo) of the photosensitive material must be inevitably set to be high.

As will be described later in detail, on the other hand, it is desired that the charged potential (Vo) of the photosensitive material, i.e., the potential of before being exposed to light is as low as possible from the standpoint of decreasing the dependency of the potential (Vr) of the exposed portion upon the thickness of the film and stably forming the image over a wide range of film thickness.

In the image-forming apparatus of the present invention, therefore, the following conditions are set in order to maintain a sufficiently high image density while avoiding wasteful consumption of the toner and setting the charged potential (Vo) to be as low as possible.

Figure 2:
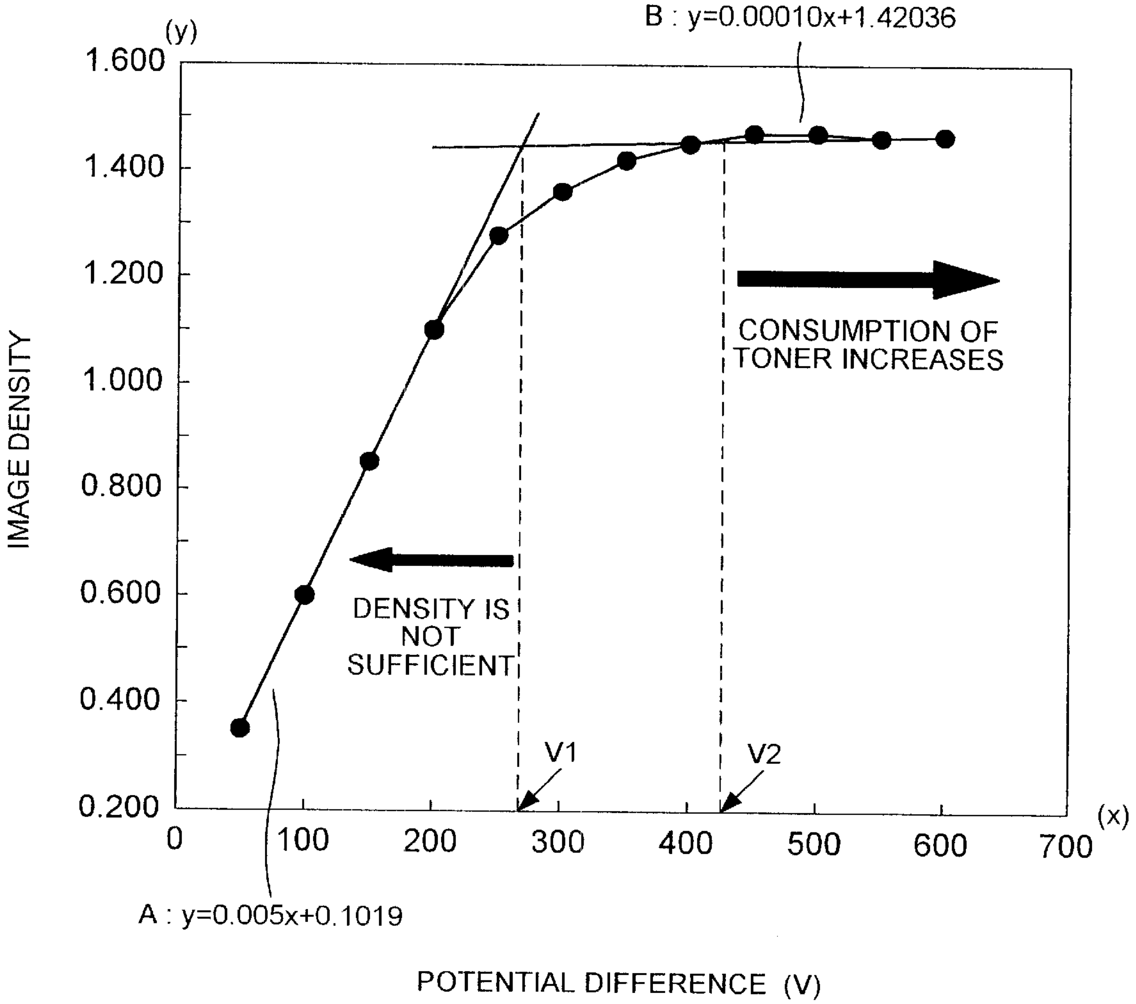
FIG. 2 is a graph illustrating, on an enlarged scale, a region where the potential difference is on the plus side in the graph of FIG. 1.

FIG. 2 is a diagram illustrating the plus region of the curve of FIG. 1 on an enlarged scale. From FIG. 2 are found an approximated straight line A of a region in which the image density linearly increases with respect to the potential difference of the abscissa and an approximated straight line B of a region (saturated region) in which the image density does not almost change with respect to the potential difference. In this case, the saturated region is the one where the rate of change of the image density with respect to the change in the potential difference (bias) is one-tenth or less than the rate of change of the image density in the region of the straight line.

In FIG. 2, for example, the image density is measured for every increase of bias voltage by 50 V. When the abscissa is denoted by x and the ordinate by y, the approximated straight line A in the region of the straight line is given by the following formula (3), $$y=0.005x+0.1019 \tag{3}$$

and the approximated straight line B in the saturated region is given by the following formula (4), $$y=0.00010x+1.42036 \tag{4}$$

As will be obvious from these formulas (3) and (4), the ratio of change of the image density (gradient of straight line A) in the region of the straight line is of the order of 1/1000, and the ratio of change of the image density (gradient of straight line B) in the saturated region is of the order of 1/10000.

In the present invention, the potential difference corresponding to a point where the above two approximated straight lines A and B intersect is denoted by V1, and the potential difference corresponding to a point at where the approximated straight line B of the saturated region separates away from the developing characteristics curve is denoted by V2.

In the region where the potential difference is lower than V1, a sufficiently large image density is not obtained. Further, in the region where the potential difference is larger than V2, the charged potential (Vo) of the photosensitive material is high, i.e., the potential of before being exposed to light is high and the toner is consumed in large amounts despite the image density is not increased much, therefore the region is not suited for the object of the present invention.

Therefore, in order to suppress the dependency of the potential (Vr) of the exposed portion upon the thickness of the film while maintaining a sufficient degree of image density, the conditions must be such that the potential difference is not smaller than V1 but is not larger than V2. As described already, the abscissa represents the potential difference (DB−Vr) between the developing bias potential (DB) and the potential (Vr) of the exposed portion. In the present invention, therefore, it becomes necessary to satisfy the conditions of the following formula (1a), $$V1 \leqq DB-Vr \leqq V2 \tag{1a}$$

Next, described below is a minus region in the developing characteristics curve of FIG. 1. The minus region of FIG. 1 corresponds to the potential difference (DB−Vo) in the practical image-forming process. The potential difference represents a degree of margin in the image fogging. Unless a potential difference of larger than a given value is maintained, there occurs image fogging and a favorable image is not obtained. When the potential difference is too large, there occurs troubles in the developing such as carrier dragging, and a favorable image is not obtained, either. Therefore, the potential difference (DB−Vo), too, must lie within a predetermined suitable range. In the present invention, therefore, the conditions must be so set as to satisfy this range, too.

Figure 3:
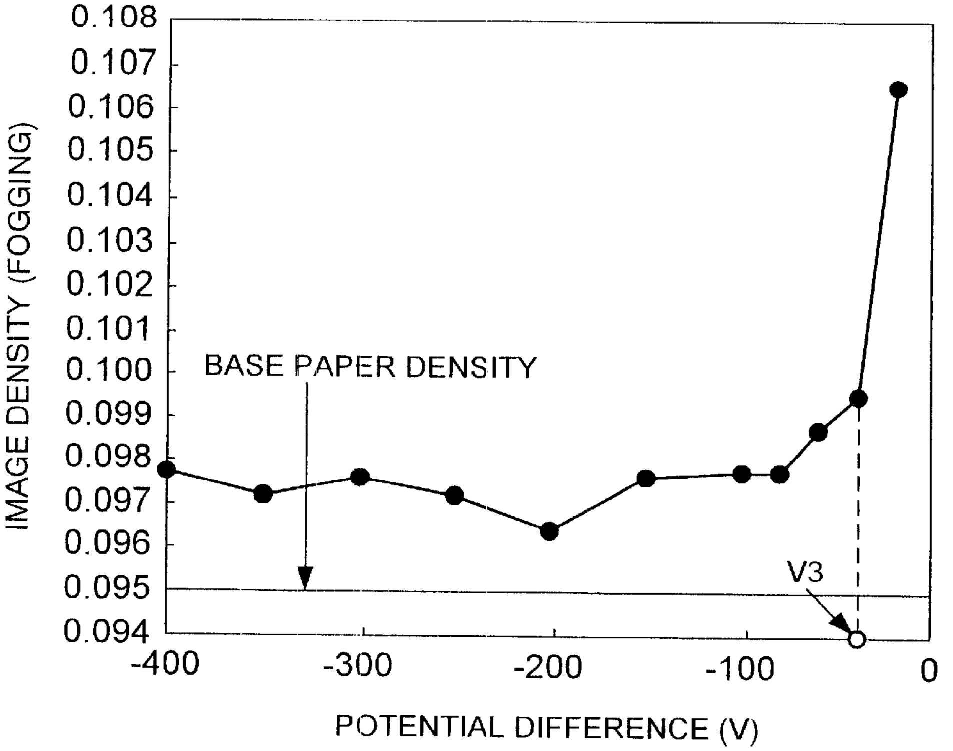
FIG. 3 is a graph illustrating, on an enlarged scale, a region where the potential difference is on the minus side in the graph of FIG. 1.

FIG. 3 is a diagram illustrating, on an enlarged scale, the minus region of the developing characteristics curve of FIG. 1. As described already, this region corresponds to the region of image fogging. Usually, it can be considered that the fogging is occurring when the measured density is higher than the reflected density of the paper by more than 0.005. To obtain a favorable image without fogging, therefore, the potential difference (DB−Vo) must be set to be smaller than the potential of +0.005 relative to the base paper density in terms of developing characteristics (hereinafter referred to as reference fogging potential). In FIG. 3, the reference fogging potential is expressed by −V3 (V3 is an absolute value). Since the abscissa represents the potential difference (DB−Vo), the condition is expressed by the following formula (2a), $$DB-Vo \leqq -V3 \tag{2a}$$

When the condition is set to the extreme left side in FIG. 3, there occurs trouble in the developing such as carrier flying. Generally, the trouble in the developing easily occurs when the potential difference (DB−Vo) exceeds 300 V. In the case of FIG. 3, therefore, attention must be given such that −300 V is not exceeded. Therefore, the condition is expressed by the following formula (2b), $$DB-Vo \geqq -300 \tag{2b}$$

From the above formulas (2a) and (2b), therefore, the following formula (2c) is derived, $$V3 \leqq Vo-DB \leqq 300 \tag{2c}$$

The above formulas (1a) and (2c) are for conducting the developing by using a positively charged photosensitive material and a positively charged toner. When the developing is conducted by using a negatively charged photosensitive material and a negatively charged toner, therefore, the directions of inequality signs are quite reversed. Therefore, the formulas (1a) and (2c) can be rewritten as follows with V1, V2 and V3 expressing absolute values, $$V1 \leqq -(DB-Vr) \leqq V2 \tag{1a'}$$

$$V3 \leqq -(Vo-DB) \leqq 300 \tag{2c'}$$

By combining the above formulas together, therefore, the present invention must satisfy the following formulas (1) and (2), $$V1 \leqq |DB-Vr| \leqq V2 \tag{1}$$

$$V3 \leqq |Vo-DB| \leqq 300 \tag{2}$$

In the practical image-forming apparatus, it is desired that a margin of 50 V is imparted to the potential difference (Vo−DB) of the formula (2) as expressed by the following formula, $$V3+50 \leqq |Vo-DB| \leqq 250 \tag{2'}$$

According to the present invention, the charged potential (Vo) of the photosensitive material, the potential (Vr) of the exposed portion of the photosensitive material and the developing bias potential (DB) are so set as to satisfy the above formulas (1) and (2), in order to suppress the range in which the potential of the exposed portion of the photosensitive material varies depending upon the thickness of the film, to use the photosensitive material over a wide range of film thickness without using cumbersome means such as correcting the exposure amount and without substantially decreasing the image density, and saving the consumption of the toner as compared at a predetermined image density.

These facts will become obvious from Examples appearing later.

The developing characteristics curve of FIG. 1 and the above formula (1) indicate that decreasing the potential (Vr) of the exposed portion of the photosensitive material as small as possible, is effective in maintaining a sufficiently large image density.

The present inventors have discovered the fact that the dependency of the potential of the exposed portion upon the film thickness is greatly affected by the main charged potential (Vo) of the photosensitive material, i.e., greatly affected by the initial potential of before being exposed to light and that, by lowering the initial potential (Vo), the dependency of the potential of the exposed portion upon the film thickness can be suppressed.

Figure 4:
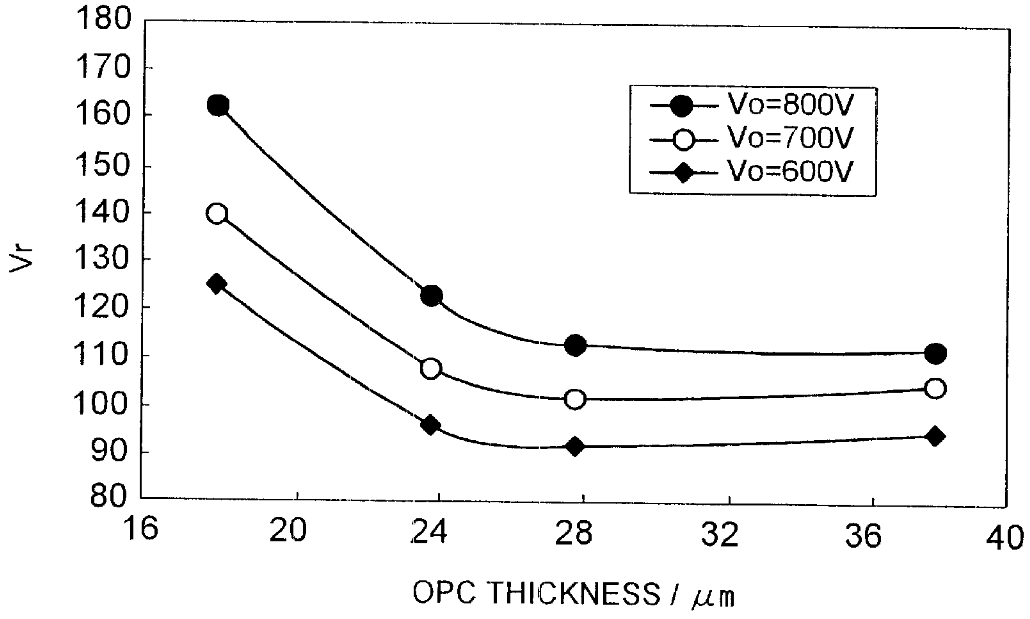
FIG. 4 is a graph illustrating the dependence of the potential (Vr) of the exposed portion upon the thickness of the film of when the charged potential of the photosensitive material is changed, i.e., when the initial potential (Vo) of the photosensitive material of before being exposed to light is changed from 800 V to 600 V in a case where the exposure amount of the photosensitive material is set to be constant (four times as large as the half exposure amount)

FIG. 4 illustrates the dependency of the potential (Vr) of the exposed portion upon the film thickness of when the initial potential (Vo) is changed from 800 volts to 600 volts in the case when the exposure amount of the photosensitive material is set to be constant, i.e., set to be four times as large as the half exposure amount.

Figure 5:
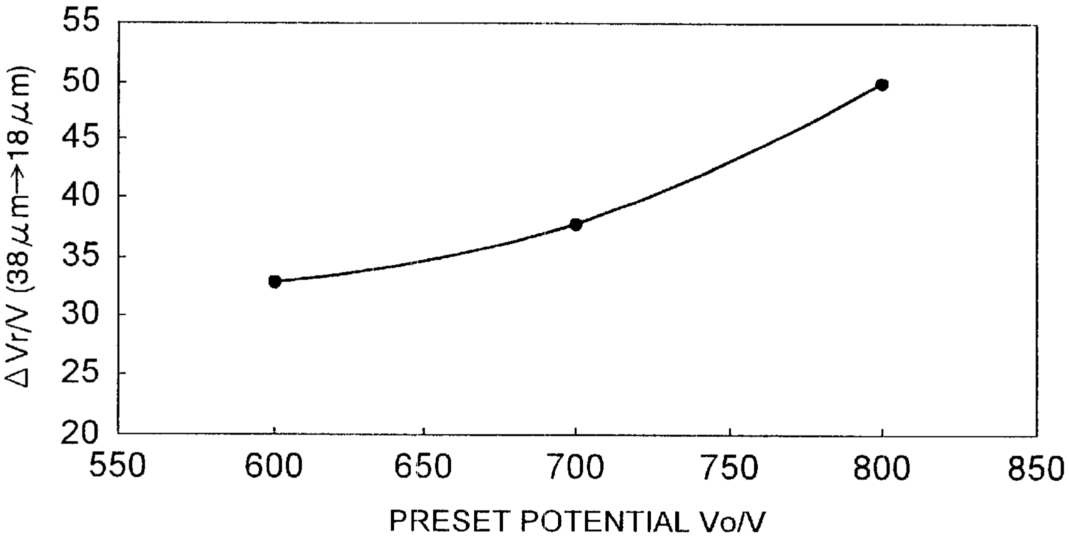
FIG. 5 is a graph plotting a relationship between the amount of change in the potential (Vr) of the exposed portion and the charged potential (Vo) of the photosensitive material over a range of film thickness of from 38 $\mu$m to 18 $\mu$m.

FIG. 5 is a diagram where the results of FIG. 4 are plotted with the initial potential (Vo) as the abscissa and the amount of change in the potential of the exposed portion (ΔVr, film thickness 38 μm→18 μm) as the ordinate.

From the results of FIGS. 4 and 5, it will be learned that setting the initial potential (Vo) of the photosensitive material to a low potential is effective in lowering the dependency of the potential (Vr) of the exposed portion upon the film thickness.

For example, when the exposure amount is set to be four times as large as the half exposure amount with Vo being set to 800 V, a change in the potential (Vr) of the exposed portion is 50 V relative to a change in the film thickness by 20 μm. On the other hand, when the potential is set to Vo=600 V which is lower than the above potential by 200 V, a change in the potential (Vr) of the exposed portion can be decreased down to 33 V relative to a change in the film thickness by 20 μm.

In the present invention, the image is formed maintaining a favorable image density without using cumbersome correction means over a wide range of film thickness by so setting the initial potential (vo) of the photosensitive material that a difference (ΔVr) between the potential of the exposed portion of the photosensitive material and the potential of the exposed portion of the photosensitive material in the early stage of use is not larger than 50 volts and, particularly preferably, not larger than 40 volts when the thickness of the film is decreased by 15 μm due to abrasion.

More preferably, the initial potential of before the photosensitive material is exposed to light is set, i.e., the main charged potential (Vo) is set as given by the following formula (5), $$V2+V3+Vr+50 \leqq Vo \leqq V1+Vr+250 \quad (5)$$

wherein the parameters V1 to V3, Vo and Vr have meanings as described earlier and are all in absolute values.

The inventors have further discovered that the dependency of the potential of the exposed portion of the photosensitive material upon the film thickness varies relying upon the exposure amount, the dependency of the potential of the exposed portion upon the film thickness decreasing with an increase in the intensity of light to which the photosensitive material is exposed.

Figure 6:
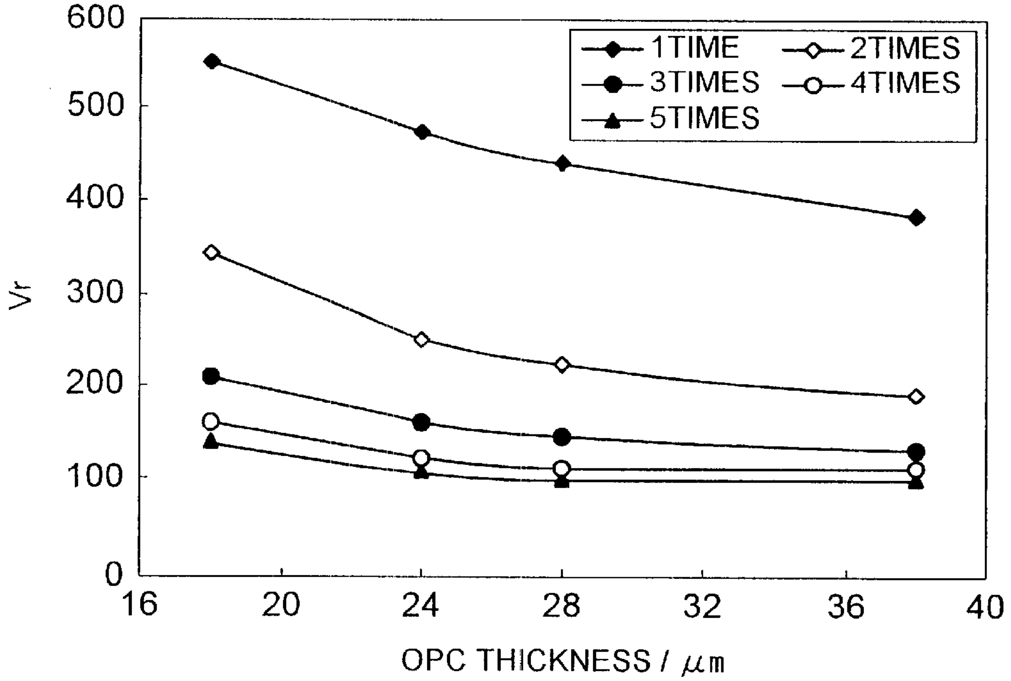
FIG. 6 is a graph plotting a relationship between the thickness of the photosensitive layer of the photosensitive material and the potential of the exposed portion using an organic photosensitive material of an Example.

FIG. 6 is a graph plotting relationships between the film thickness of the photosensitive material and the potential of the exposed portion using organic photosensitive materials of Examples appearing later. This graph shows potentials (Vr) of the exposed portion of when the main charged potential (Vo) of the photosensitive material is set to 800 V, the exposure amount is set to be an integer times as large as the half exposure amount, and the thickness of the film is decreased from a first value of 38 μm down to finally 18 μm.

The results tell the dependency upon the film thickness in that the potential (Vr) of the exposed portion monotonously increases accompanying a decrease in the thickness of the film due to abrasion. It is obvious that upon increasing the exposure amount to two times, three times, four times and five times as large as the half exposure amount, the level of the potential (Vr) of the exposed portion decreases as compared at the same film thickness, and the potential (Vr) of the exposed portion becomes less dependent upon the thickness of the film.

From the results of FIG. 6, it can be comprehended that the exposure amount of the photosensitive material may be selected to be not smaller than three times, and particularly, not smaller than 4 times as large as the half exposure amount in order to suppress the potential of the exposed portion down to a low level and to suppress the dependency of the potential of the exposed portion upon the thickness of the film irrespective of a decrease in the thickness of the film due to abrasion.

Figure 7:
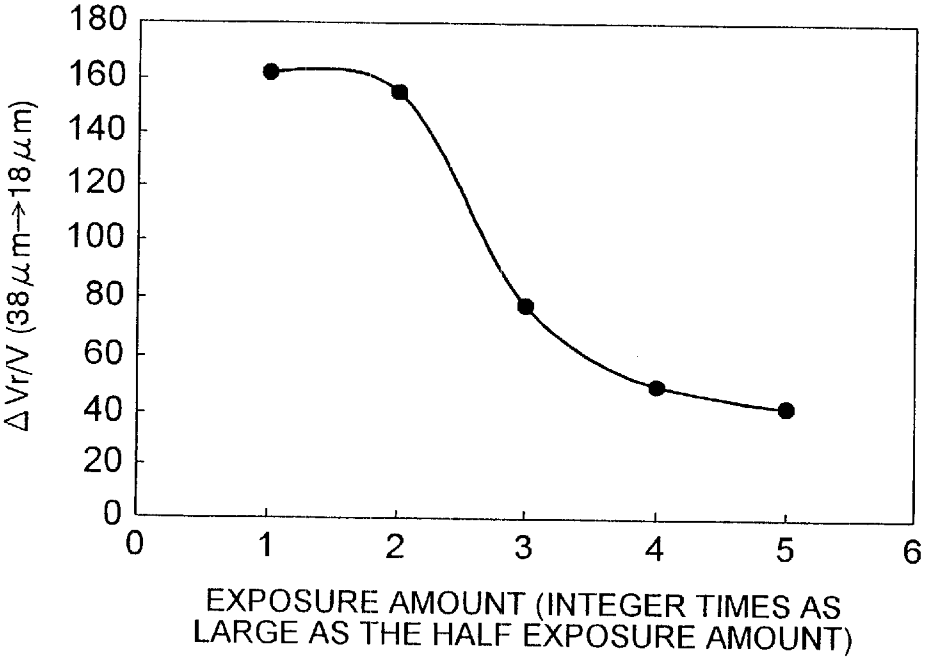
FIG. 7 is a graph plotting a relationship between the amount of change in the potential (Vr) of the exposed portion and the exposure amount which is an integer times as large as the half exposure amount over a range of film thickness of from 38 $\mu$m to 18 $\mu$m.

FIG. 7 is a diagram plotting a relationship between the amount of change in the potential (Vr) of the exposed portion and the exposure amount which is an integer times as large as the half exposure amount in a range of a film thickness of from 38 μm to 18 μm. It will be obvious from FIG. 7, too, that the dependency of the potential of the exposed portion upon the film thickness can be suppressed by setting the exposure amount of the photosensitive material to be not smaller than three times and, particularly, not smaller than 4 times as large as the half exposure amount.

When the exposure amount is increased on the other hand, the potential of the exposed portion becomes less dependent upon the thickness of the film. When the exposure amount becomes too great, on the other hand, there arouses a problem of optical fatigue of the photosensitive material. In general, problems such as optical fatigue occur when the exposure amount exceeds 10 times as large as the half exposure amount.

From the foregoing according to the present invention, the potential of the exposed portion becomes less dependent upon the thickness of the film and the photosensitive material can be used over a wide range of film thickness without causing a problem of optical fatigue as a result of setting the exposure amount of the exposure device that irradiates the photosensitive material with light to be not smaller than 3 times but not larger than 10 times and, particularly, not smaller than 4 times but not larger than 6 times as large as the half exposure amount.

In a state where the photosensitive material can be used in only a range in which the potential (Vr) of the exposed portion rises by, for example, not more than 50 volts, a limit film thickness is 25 μm when the exposure amount is set to be two times as large as the half exposure amount, but the photosensitive material can be used until the film thickness becomes about 22 μm when the exposure amount is set to be three times as large as the half exposure amount, and the photosensitive material can be used until the film thickness becomes 18 μm when the exposure amount is set to be five times as large as the half exposure amount, as is learned from FIG. 6, thus enabling the photosensitive material to be used over a wide range.

In this specification, the half exposure amount of the photosensitive material stands for the same meaning as the one used in this field of art, and is defined as the exposure amount $\mu J/cm^2$ of until the surface potential of the photosensitive material drops down to one-half the main charged potential (potential of before being exposed to light) (Vo).

Figure 8:
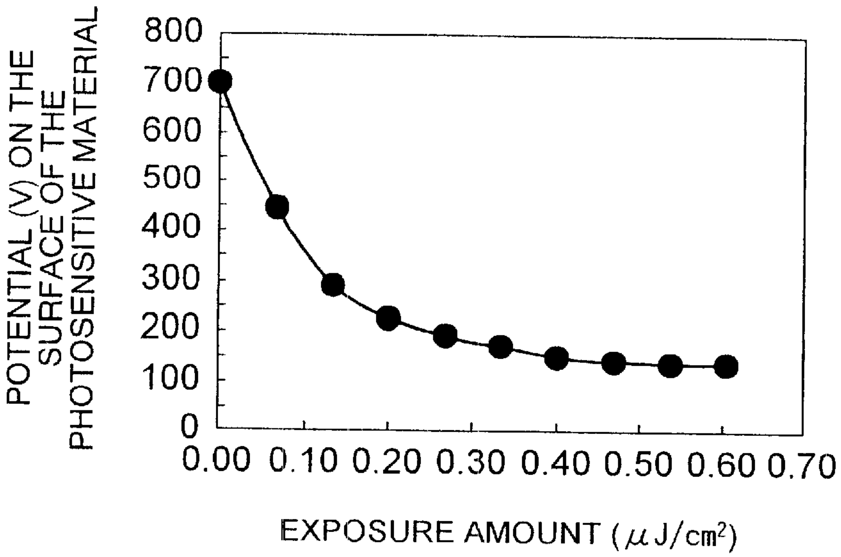
FIG. 8 is a graph illustrating how to find the half exposure amount from a photoattenuation curve.

FIG. 8 illustrates how to find the half exposure amount. In FIG. 8, the ordinate represents the surface potential (V) of the photosensitive material, the abscissa represents the exposure amount $\mu J/cm^2$ for the photosensitive material, and a curve is called photoattenuation curve which is specific to the individual photosensitive materials.

In the case of FIG. 8, for example, since the main charged potential (Vo) is 700 volts, the half exposure amount is found as 0.1 $\mu J/cm^2$ which is the exposure amount of when the surface potential of the photosensitive material becomes 350 volts that is one-half the surface potential (Vo) of before being exposed to light.

The above half exposure amount is found for a particular photosensitive material, and is preferably found by using the surface potential (Vo) of the photosensitive material of before being exposed to light practically used by an image-forming apparatus and by using, as a reference, a source of light having the same spectral characteristics.

When the half exposure amount of the photosensitive material is found, the exposure amount for the photosensitive material is set to be 3 to 10 times and, particularly, 4 to 6 times as large as the half exposure amount. The exposure amount can be easily set by setting the energy input to the source of light, by setting the rate of exposure to light or the time for exposure to light, or by a combination thereof.

It is desired that the photosensitive material used for the image-forming apparatus of the present invention is preferably an organic photosensitive material containing a charge-generating agent and a charge-transporting agent. The organic photosensitive material permits the film thickness to vary to a degree that is not negligible due to the abrasion after the repetitive use and, besides, the potential of the exposed portion tends to vary depending upon the film thickness but not linearly. Upon setting the exposure amount in accordance with the present invention, however, it is allowed to suppress the dependency of the potential of the exposed portion of the photosensitive material upon the film thickness and, hence, to maintain a favorable formation of images for extended periods of time, which is an advantage. It is further desired that the photosensitive material used for the image-forming apparatus of the present invention is a positively charged photosensitive material from the standpoint of suppressing the generation of ozone at the time when the photosensitive material is electrically charged.

Image-Forming Apparatus

Figure 9:
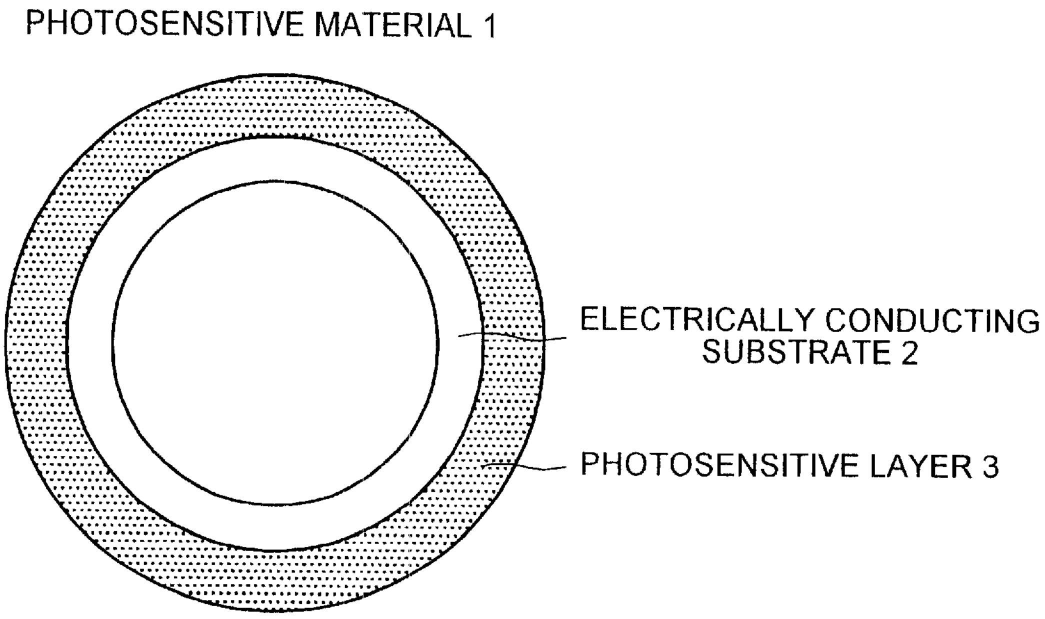
FIG. 9 is a diagram illustrating the cross-sectional structure of the photosensitive material that is used.

The present invention is concerned with an image-forming apparatus for forming images through the electric charging of the photosensitive material drum, exposure to light, developing and transfer of image. Referring to FIG. 9, the photosensitive material 1 used for the image-forming apparatus comprises an electrically conducting substrate 2 such as an aluminum blank tube and a photosensitive layer 3 formed thereon. The photosensitive layer 3 preferably contains a charge-generating agent and a charge-transporting agent. Most desirably, the photosensitive layer comprises a single organic photosensitive layer.

Figure 10:
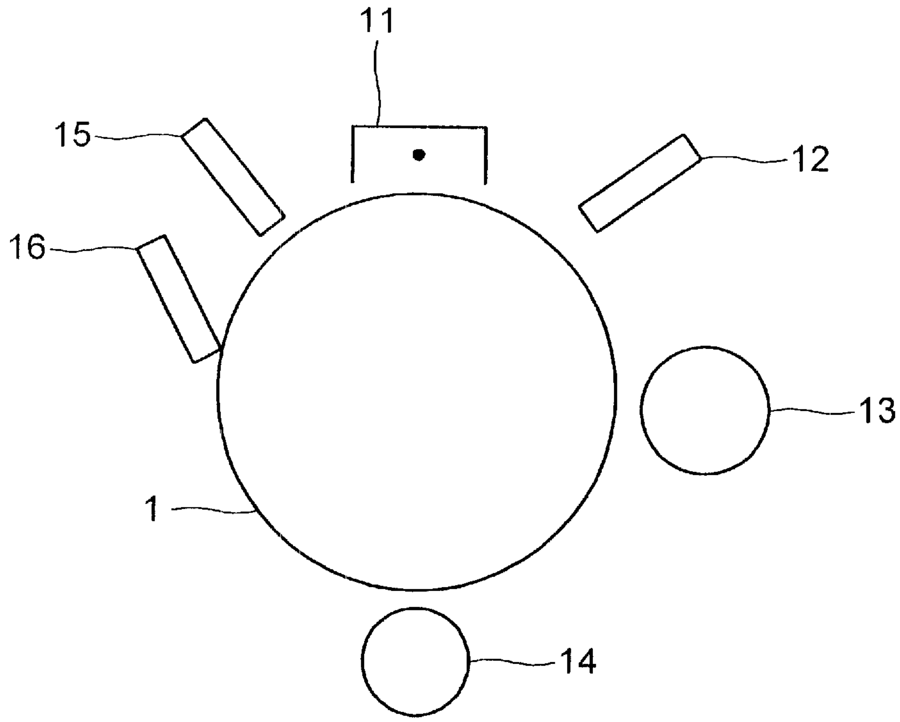
FIG. 10 is a diagram schematically illustrating the arrangement of the image-forming apparatus of the present invention.

Referring to FIG. 10 schematically illustrating the image-forming apparatus of the present invention, there are arranged a corona charger 11 for main electric charging, an optical system 12 for exposure to image-bearing light, a developer 13, a transfer roller 14, a source of light 15 for removing electric charge and a residual toner-cleaning device 16 surrounding the rotary photosensitive material drum 1 provided with the photosensitive layer.

A DC power source which is not shown is connected to the transfer roller 14 for applying a DC voltage for transfer. In the case of the positive developing, a voltage of the same polarity as that of the main charger 11 is used as a voltage for transfer. In the case of the reversal developing, on the other hand, there is used a voltage of the polarity opposite to that of the main charger 11.

In forming the image, the photosensitive layer 3 of the photosensitive material drum 1 is uniformly charged positively or negatively by the corona charger 11. Due to the main charging, the surface potential (Vo) of the photosensitive layer 3 is set in a range of from 500 to 1000 V in absolute value.

Then, the photosensitive layer 3 is exposed to image-bearing light due to the optical system 12, whereby the potential of a portion (e.g., portion irradiated to laser beam or the like beam) corresponding to the image of manuscript on the photosensitive layer 3 becomes the potential (Vr) of the exposed portion, the potential of a portion (background) not irradiated with light is maintained at a dark attenuation potential from the main charged potential, and an electrostatic latent image is formed.

The electrostatic latent image is developed by the developer 13, and a toner image is formed on the surface of the photosensitive layer. Developing due to the developer 13 is executed by either the positive developing or the reversal developing.

The reversal developing is executed by the magnetic brush developing method by using a known developing agent of a toner electrically charged to the same polarity as that of the main charge polarity of the photosensitive layer 3, e.g., by using a developing agent of the one-component type or the two-component type.

That is, the toner image is formed on the portion irradiated with the laser beam, the toner image being electrically charged to the same polarity as the main charge polarity. In this case, a suitable bias voltage (DB) is applied across the developer 13 and the photosensitive material drum 6 to effectively execute the developing like in the prior art.

The toner image formed on the surface of the photosensitive layer is transferred onto a transfer member such as a paper passing through between the transfer roller 14 and the photosensitive material drum 1. Then, the electric charge is removed from the photosensitive layer 3 by being irradiated with light from the source of light 15 for removing electric charge.

After the image is transferred and the electric charge is removed as described above, the toner remaining on the photosensitive layer 3 is removed by the cleaning device 16, and a next cycle is executed for forming image. As required, further, the toner image transferred onto the transfer member is fixed to the transfer member by the application of heat or pressure.

Photosensitive Material

It is desired that the organic photosensitive material used for the image-forming apparatus of the present invention is the one of a form in which a charge-generating agent is dispersed in a resin medium. Great effect is exhibited particularly when the organic photosensitive material is a single dispersion layer type containing a charge-transporting agent and, particularly, containing a positive hole-transporting agent and a charge-generating agent in a resin medium.

In the present invention, it is of course allowable to use a photosensitive material of the laminated layer type including a charge-transporting layer containing the charge-transporting agent and a charge-generating layer containing the charge-generating agent. In this case, the photosensitive material may be the one in which the charge-generating layer (CGL) and the charge-transporting layer (CTL) are laminated in this order or in the reverse order.

As the charge-generating agent, there can be exemplified selenium, selenium-tellurium, amorphous silicon, pyrylium salt, azo pigment, dis-azo pigment, anthanthrone pigment, phthalocyanine pigment, indigo pigment, threne pigment, toluidine pigment, pyrazoline pigment, perillene pigment and quinacridone pigment, which may be used in one kind or being mixed together in two or more kinds so as to exhibit absorbing wavelengths in a desired region.

Particularly preferred examples include X-type metal-free phthalocyanine, oxotitanyl phthalocyanine, perillene pigments and, particularly, those expressed by the general formula (1), (1)

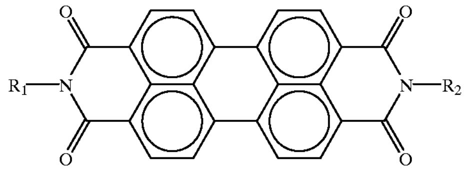

wherein $R_1$ and $R_2$ are substituted or unsubstituted alkyl groups having not more than 18 carbon atoms, cycloalkyl groups, aryl groups, alkaryl groups or aralkyl groups.

As the alkyl groups, there can be exemplified ethyl groups, propyl groups, butyl groups and 2-ethylhexyl groups. As the cycloalkyl groups, there can be exemplified cyclohexyl groups. As the aryl groups, there can be exemplified phenyl groups and naphthyl groups. As the alkaryl groups, there can be exemplified tolyl groups, xylyl groups and ethylphenyl groups. As the aralkyl groups, there can be exemplified benzyl groups and phenetyl groups. As the substituents, there can be exemplified alkoxyl groups and halogen atoms.

As the resin medium in which the charge-generating agent is dispersed, there can be used various resins like olefinic polymers such as styrene polymer, acrylic polymer, styrene-acrylic polymer, ethylene-vinyl acetate copolymer, polypropylene and ionomer; polyvinyl chloride, vinyl chloride-vinyl acetate copolymer, polyester, alkyd resin, polyamide, polyurethane, epoxy resin, polycarbonate, polyarylate, polysulfone, diallyl phthalate resin, silicone resin, ketone resin, polyvinyl butyral resin, polyether resin, phenol resin and photo-curable resin such as epoxyacrylate. These binder resins can be used in one kind or being mixed together in two or more kinds. Preferred examples of the resins include styrene polymer, acrylic polymer, styrene-acrylic polymer, polyester, alkyd resin, polycarbonate and polyarylate.

Particularly preferred examples of the resins include polycarbonate, Panlite manufactured by Teijin Kasei Co., PCZ manufactured by Mitsubishi Gas Kagaku Co., and a polycarbonate derived from phosgene and bisphenols expressed by the following general formula (2), (2)

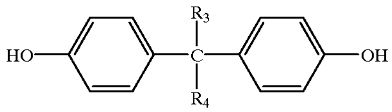

wherein $R_3$ and $R_4$ are hydrogen atoms or lower alkyl groups, which being coupled together may form a cyclo ring such as cyclohexane ring together with carbon atoms bonded thereto.

The charge-transporting agents (CTM) will be those having a charge-transporting property and those having a positive hole-transporting property, which may be also used in combination. Preferred examples include electron-attracting substances such as paradiphenoquinone derivatives, benzoquinone derivatives, naphthoquinone derivatives, tetracyanoethylene, tetracyanoquinodimethane, chloroanil, bromoanil, 2,4,7-trinitro-9-fluorenone, 2,4,5,7-tetranitro-9-fluorenone, 2,4,7-trinitro-9-dicyanomethylene fluorenone, 2,4,5,7-tetranitroxanthone, 2,4,8-trinitrothioxanthone, as well as those electron-attracting substances of high molecular forms.

Among them, paradiphenoquinone derivatives and, particularly, paradiphenoquinone derivatives of the asymmetrical type are preferred because of their excellent solubility and excellent electron-transporting property.

The paradiphenoquinone derivatives are those expressed by he following general formula (3), (3)

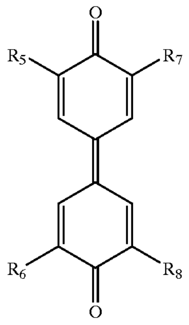

wherein $R_5$, $R_6$, $R_7$ and $R_8$ are hydrogen atoms, alkyl groups, cycloalkyl groups, aryl groups, aralkyl groups or alkoxy groups.

It is desired that $R_5$, $R_6$, $R_7$ and $R_8$ are substituents having asymmetrical structures. Among $R_5$, $R_6$, $R_7$ and $R_8$, for example, it is desired that the two are lower alkyl groups and the other two are branched-chain alkyl groups, cycloalkyl groups, aryl groups or aralkyl groups.

Though not limited thereto only, suitable examples include 3,5-dimethyl-3',5'-di-t-butyl diphenoquinone, 3,5-dimethoxy-3',5'-di-t-butyl diphenoquinone, 3,3'-dimethyl-5,5'-di-t-butyl diphenoquinone, 3,5'-dimethyl-3',5-di-t-dibutyl diphenoquinone, 3,5,3',5'-tetramethyl diphenoquinone, 2,6,2',6'-tetra-t-butyl diphenoquinone, 3,5,3',5'-tetraphenyl diphenoquinone, and 3,5,3',5'-tetracyclohexyl diphenoquinone. These diphenoquinone derivatives are desirable because of their low symmetry of molecules exhibiting small mutual action among the molecules and excellent solubility.

As the positive hole-transporting substance, there have been known the following compounds and from which those having excellent solubility and positive hole-transporting property are selected and used; i.e., pyrene;
N-ethylcarbazole;
N-isopropylcarbazole;
N-methyl-N-phenylhydrazino-3-methylidene-9-carbazole;
N,N-diphenylhydrazino-3-methylidene-9-ethylcarbazole;
N,N-diphenylhydrazino-3-methylidene-10-ethylphenothiazine;
N,N-diphenylhydrazino-3-methylidene-10-ethylphenoxazine;
p-diethylaminobenzaldehyde-N,N-diphenylhydrazone;
p-diethylaminobenzaldehyde-α-naphthyl-N-phenylhydrazone;
p-pyrrolidinobenzaldehyde-N,N-diphenylhydrazone;
1,3,3-trimethylindolenine-ω-aldehyde-N,N-diphenylhydrazone;
p-diethylbenzaldehyde-3-methylbenzthiazolinone-2-hydrazone;
2,5-bis(p-diethylaminophenyl)-1,3,4-oxadiazole;
1-phenyl-3-(p-diethylaminostyryl)-5-(p-diethylaminophenyl)pyrazoline;
1-[quinonyl(2)]-3-(p-diethylaminostyryl)-5-(p-diethylaminophenyl)pyrazoline;
1-[pyridyl(2)]-3-(p-diethylaminostyryl)-5-(p-diethylaminophenyl)pyrazoline;
1-[6-methoxy-pyridyl(2)]-3-(p-diethylaminostyryl)-5-(p-diethylaminophenyl)pyrazoline;
1-[pyridyl(3)]-3-(p-diethylaminostyryl)-5-(p-diethylaminophenyl)pyrazoline;
1-[lepidyl(3)]-3-(p-diethylaminostyryl)-5-(p-diethylaminophenyl)pyrazoline; 1-[pyridyl(2)]-3-(p-diethylaminostyryl)-4-methyl-5-(p-diethylaminophenyl)pyrazoline;
1-[pyridyl(2)]-3-(αmethyl-p-diethylaminostyryl)-3-(p-diethylaminophenyl)pyrazoline;
1-phenyl-3-(p-diethylaminostyryl)-4-methyl-5-(p-diethylaminophenyl)pyrazoline;
spiropyrazoline;
oxazole compounds such as 2-(p-diethylaminostyryl)-3-diethylaminobenzoxazole, and 2(p-diethylaminophenyl)-4-(p-dimethylaminophenyl)-5-(2-chlorophenyl)oxazole;
triarylmethane compounds such as 2-(p-diethylaminostyryl)-6-diethylaminobenzothiazole and bis(4-diethylamino-2-methylphenyl)phenylmethane;
polyarylalkanes such as 1,1-bis(4-N,N-diethylamino-2-methylphenyl)heptane and 1,1,2,2-tetrakis(4-N,N-dimethylamino-2-methylphenyl)ethane;
benzidine compounds such as N,N'-diphenyl-N,N'-bis(methylphenyl)benzidine, N,N'-diphenyl-N,N'-bis(ethylphenyl)benzidine, N,N'-diphenyl-N,N'-bis(propylphenyl)benzidine, N,N'-diphenyl-N,N'-bis(butylphenyl)benzidine, N,N'-bis(isopropylphenyl)benzidine,
N,N'-diphenyl-N,N'-bis(secondary butylphenyl)benzidine,
N,N'-diphenyl-N,N'-bis(tertiary butylphenyl)benzidine,
N,N'-diphenyl-N,N'-bis(2,4-dimethylphenyl)benzidine, and
N,N'-diphenyl-N,N'-bis(chlorophenyl)benzidine;
triphenylamine;
poly-N-vinylcarbazole;
polyvinyl pyrene;
polyvinyl anthracene;
polyvinyl acridine;
poly-9-vinylphenyl anthracene;
pyrene-formaldehyde resin; and
ethylcarbazole formaldehyde resin.

Among them, it is desired to use the benzidene transporting agent and, particularly, the one represented by the general formula (4), (4)

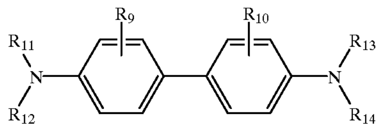

wherein $R_9$ and $R_{10}$ are lower alkyl groups such as methyl groups or ethyl groups, and $R_{11}$, $R_{12}$, $R_{13}$ and $R_{14}$ are alkyl groups having not more than 18 carbon atoms, cycloalkyl groups, aryl groups, alkaryl groups or aralkyl groups, and the carbazolehydrazone transporting agent and, particularly, the one represented by the general formula (5), (5)

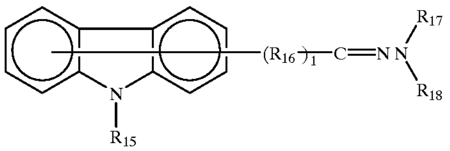

wherein $R_{15}$ is a hydrogen atom, an alkyl group or an acyl group, $R_{16}$ is a divalent organic group such as alkylene group, and $R_{17}$ and $R_{18}$ are alkyl groups having not more than 18 carbon atoms, cycloalkyl groups, aryl groups, alkaryl groups or aralkyl groups.

More concretely, there can be exemplified N,N,N',N'-tetra-p-tolyl-3,3'-dimethyl benzidine and the like.

In the single dispersion layer-type photosensitive material used in the present invention, it is desired that the charge-generating agent (CGM) is contained in the photosensitive layer in an amount of from 0.1 to 10% by weight and, particularly, in an amount of from 0.3 to 3.0% by weight per the solid components and that the charge-transporting agent (CTM) is contained in the photosensitive layer in an amount of from 20 to 70% by weight and, particularly, in an amount of from 30 to 65% by weight per the solid components.

From the standpoint of wide range of use such as sensitivity and reversal developing, it is desired to use the electron-transporting agent (ET) and the positive hole-transporting agent (HT) in combination. In this case, it is most desired that the weight ratio of ET:HT is from 1:15 to 15:1 and, particularly, from 3:10 to 10:3.

The composition for forming the photosensitive material used in the present invention may be blended with known blending agents such as antioxidant, radical-trapping agent, singlet quencher, UV-absorbing agent, softening agent, surface-reforming agent, defoaming agent, filler, viscosity-imparting agent, dispersion stabilizer, wax, acceptor and donor in a range in which they will not adversely affect the electrophotographic properties.

Further, the blending of a steric hindrance phenolic antioxidant in an amount of from 0.1 to 50% by weight per the whole solid components makes it possible to markedly improve the durability of the photosensitive layer without adversely affecting the electrophotographic properties.

As the electrically conducting substrate on which the photosensitive layer is to be formed, there can be used various materials having electrically conducting properties such as simple metals, e.g., aluminum, copper, tin, platinum, golds silver, vanadium, molybdenum, chromium, cadmium, titanium, nickel, indium, stainless steel and brass, as well as a plastic material on which the above metal is deposited or laminated and a glass coated with aluminum iodide, tin oxide or indium oxide.

The single dispersion layer-type photosensitive material used in the present invention employs an ordinary aluminum blank tube and, particularly, a blank tube treated with alumite such that the film thickness is from 1 to 50 μm since it does not generate interference fringes.

In order to form the single dispersion layer-type photosensitive material, the charge-generating material, the charge-transporting agent and the binder resin are prepared by a customary method by using, for example, a roll mill, a ball mill, attritor, a paint shaker or an ultrasonic dispersing device, and are applied by using a known application means and are dried.

Though there is no particular limitation, it is desired that the photosensitive layer has a thickness of generally from 10 to 60 μm and, particularly, from 15 to 50 μm.

As the solvent used for forming the coating solution, there can be used various organic solvents like alcohols such as methanol, ethanol, isopropanol and butanol; aliphatic hydrocarbons such as n-hexane, octane and cyclohexane; aromatic hydrocarbons such as benzene, toluene and xylene; halogenated hydrocarbons such as dichloromethane, dichloroethane, carbon tetrachloride and chlorobenzene; ethers such as dimethyl ether, diethyl ether, tetrahydrofurane, ethylene glycol dimethyl ether, and diethylene glycol dimethyl ether; ketones such as acetone, methyl ethyl ketone, and cyclohexanone; esters such as ethyl acetate and methyl acetate; dimethylformamide; dimethyl sulfoxide, etc., which can be used in one kind or being mixed together in two or more kinds. It is desired that the concentration of solid components in the coating solution is generally from 5 to 50%.

In the case of the laminated layer-type photosensitive material, it is desired that the charge-generating agent (CGM) is contained in an amount of from 0.1 to 20% by weight and, particularly, from 0.5 to 10% by weight per the solid components in the charge-generating layer (CGL) and that the charge-transporting agent (CTM) is contained in an amount of from 20 to 70% by weight and, particularly, from 30 to 65% by weight per the solid components in the charge-transporting layer (CTL).

The components in the coated layers comply with those of the single dispersion layer-type photosensitive material.

In the case of the substrate/CGL/CTL photosensitive material, it is desired that the CGL has a thickness, generally, in a range of from 0.1 to 0.5 μm and that the CTL has a thickness in a range of from 10 to 60 μm and, particularly, from 15 to 50 μm.

In the case of the substrate/CTL/CGL photosensitive material, it is desired that the CTL has a thickness of from 10 to 60 μm and, particularly, from 15 to 50 μm and that the CGL has a thickness of from 0.1 to 3.0 μm.

Further, a known protection layer may be formed on the CGL.

Setting the Main Charged Potential (Vo)

The photosensitive material can be electrically charged by using a corona charger such as corotron or skorotron, or by using a contact-type charger such as charging roller.

It has been known that there exists an intimate relationship between the voltage applied to the charger and the main charged potential (Vo) of the photosensitive material. Upon setting the voltage applied to the charger, the main charged potential (Vo) of the photosensitive material can be set within the range described above.

Setting the Exposure Amount

In the present invention, it is desired that the exposure amount of the photosensitive material is set to be from 3 to 10 times and, particularly, from 4 to 6 times as large as the half exposure amount of the photosensitive material. When the exposure amount is smaller than the above range, the dependency of the potential (Vr) of the exposed portion upon the film thickness tends to become inferior to that of Then the exposure amount lies within the above range. On the other hand, when the exposure amount exceeds the above range, optical fatigue of the photosensitive material becomes conspicuous compared to that of when the exposure amount lies within the above-mentioned range.

In the present invention, the source of light for exposing the photosensitive material to light may be any source of light that has been used in the image-forming apparatus of the conventional electrophotography. As the source of laser beam, there can be used a semiconductor laser or a gas laser. As the source of light in the manuscript imaging system, there can be used, for example, a halogen lamp or a fluorescent lamp.

As described already, the exposure amount can be adjusted by a system which adjusts the amount of light (energy) per a unit area of the photosensitive material, by a system which adjusts the time for irradiating light or by a combination thereof.

Developing Bias

In the present invention, the developing bias potential (DB) is so applied as to satisfy the above-mentioned formulas (1) and (2) and, preferably, the formula (2'), too, to form a toner image on the photosensitive material by the reversal developing.

As the developing agent, the positively charged toner is used. As the developing agent, further, there are used the one-component toner and the two-component developing agent, i.e., the positively charged toner and the magnetic carrier in combination.

As the developer, there is used a nonmagnetic sleeve equipped with a magnet therein. The developer may be any one of the sleeve rotation type, magnet rotation type or of the type in which both of them rotate. Upon connecting the sleeve to the power source, a predetermined bias potential is applied.

EXAMPLES

The invention will now be described by way of Examples.

Formation of a Photosensitive Material Drum

The photosensitive material was prepared by using the following recipe.

(Charge-generating agent) metal-free phthalocyanine - - - 5 parts by weight (Positive hole-transporting agent) of the following formula (6) - - - 100 parts by weight

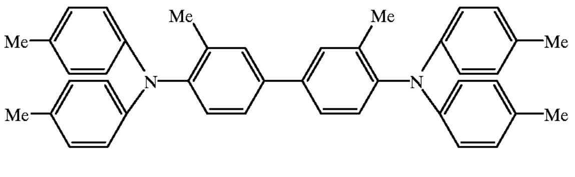

(Electron-transporting agent) of the following formula (7) - - - 30 parts by weight

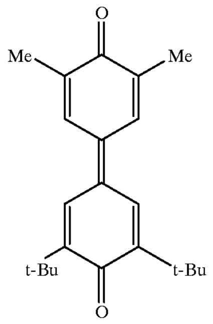

(Binder resin) polycarbonate - - - 100 parts by weight (Solvent) tetrahydrofurane - - - 800 parts by weight The above components were mixed together and dispersed by using a paint shaker. The prepared coating solution was applied onto an aluminum blank tube, and was dried with the hot air at 130° C. for 30 minutes. By adjusting the amount of application, there were formed organic photosensitive drums having film thicknesses of 38 μm, 28 μm, 24 μm and 18 μm.

Measurement of Half Exposure Amount

The photosensitive material (having a thickness of 38 μm) was mounted on an apparatus for measuring the electric characteristics of the photosensitive material modified from a copier "Creage 8331" manufactured by Kyocera-Mita Co., and the photoattenuation characteristics were measured under the following conditions.

Measuring Conditions

Photosensitive material setpoint voltage: 650 V

Source of light: LSU (laser beam)

Quantity of light on the surface of the photosensitive material: 0 to 0.61 $\mu J/cm^2$ FIG. 8 illustrates the obtained photoattenuation characteristics. The half exposure amount of 0.10 $\mu J/cm^2$ was obtained from the photoattenuation curve.

Developing Characteristics

Next, as the developing means, the magnetic brush developing was effected by using the two-component magnetic developing agent that comprises the positively charged toner, and the photosensitive material (having a thickness of 38 μm) was measured for its developing characteristics. The developing characteristics of the developing means were as shown in FIG. 1, and the characteristic potentials were as follows:

$$V1 = 265\ V$$

$$V2 = 410\ V$$

$$V3 = 50\ V \text{ (absolute value)}$$

Relationship between the Surface Potential of before being Exposed and the Potential of the Exposed Portion The photosensitive materials having various thicknesses were mounted on an apparatus for measuring the electric characteristics of the photosensitive material modified from the copier "Creage 8331" manufactured by Kyocera-Mita Co., the surface potentials (Vo) of the photosensitive material of before being exposed were set to be 600 V, 700 V and 800 V, and the exposure amount was set to be 4 times as large as the half exposure amount in order to measure the potentials (Vr) of the exposed portion by using a surface potentiometer.

The results obtained were as shown in Table 1.

TABLE 1

Measured potentials (Vr) of the exposed portion.

| Film thickness<br>Surface potential of<br>before the exposure | 38 μm | 28 μm | 24 μm | 18 μm |
|---|---|---|---|---|
| 600 V | 96 | 93 | 97 | 126 |
| 700 V | 104 | 102 | 109 | 140 |
| 800 V | 112 | 113 | 123 | 162 |

The results of measurement of Table 1 are plotted in FIG. 4.

In FIG. 5 is plotted a relationship between the exposure amount and the amount of change (ΔVr) in the potential (Vr) of the exposed portion of when the film thickness changes from 38 μm to 18 μm.

From the above results, it is obvious that upon lowly setting the surface potential (Vo) of the photosensitive material of before being exposed to light, the potential (Vr) of the exposed portion becomes less dependent upon the thickness of the film.

Relationship between the Exposure Amount and the Potential of the Exposed Portion The photosensitive materials were mounted on an apparatus for measuring the electric characteristics of the photosensitive material modified from the copier "Creage 8331" manufactured by Kyocera-Mita Co., the surface potential (Vo) of the photosensitive material was set to be 800 V, and the exposure amount was changed to be 1 time, 2 times, 3 times, 4 times and 5 times as large as the half exposure amount in order to measure the potentials (Vr) of the exposed portion by using a surface potentiometer.

The measured results were as shown in Table 2.

TABLE 2

Measured potentials (Vr) of the exposed portion.

| Film thickness<br>Exposure amount | 38 μm | 28 μm | 24 μm | 18 μm |
|---|---|---|---|---|
| 1 Time | 393 | 444 | 475 | 554 |
| 2 Times | 192 | 224 | 258 | 348 |
| 3 Times | 134 | 149 | 161 | 212 |
| 4 Times | 113 | 113 | 120 | 162 |
| 5 Times | 99 | 100 | 102 | 142 |

The measured results of Table 2 are plotted in FIG. 6.

In FIG. 7 is plotted a relationship between the exposure amount and the amount of change in the potential (Vr) of the exposed portion of when the film thickness changes from 38 μm to 18 μm.

From the above results, it is obvious that upon setting the exposure amount of the photosensitive material to be not smaller than 3 times and, particularly, not smaller than 4 times as large as the half exposure amount, the potential (Vr) of the exposed portion becomes less dependent upon the thickness of the film.

Setting the Surface Potential of before the Exposure, Exposure Amount and the Developing Bias Potential The surface potential of before the exposure, the exposure amount and the developing bias potential were set for the photosensitive material (film thickness of 38 μm) as shown in Table 3.

Table 3 also shows the measured potentials (Vr) of the exposed portions potential differences (Vo–DB) and the potential differences (DB–Vr).

TABLE 3

| | Vo (V) | Exposure amount | Vr (V) | DB (V) | (Vo-DB) (V) | (DB-Vr) (V) |
|---|---|---|---|---|---|---|
| Comp Ex 1 | 800 | 2 times | 179 | 600 | 200 | 421 |
| Comp Ex 2 | 800 | 3 times | 134 | 600 | 200 | 456 |
| Example 1 | 650 | 3 times | 118 | 450 | 200 | 332 |
| Example 2 | 650 | 4 times | 100 | 450 | 200 | 350 |

Under the above-mentioned setting conditions, the formulas (1), (2) and (2') become as described below.

Formula (1)$265 \leqq DB-Vr \leqq 410$

Formula (2)$50 \leqq Vo-DB \leqq 300$

Formula (2')$100 \leqq Vo-DB250$

The conditions should be all satisfied in order to prevent trouble in the development such as fogging of image and carrier flying. The formula (2) is satisfied in Examples 1, 2 and in Comparative Examples 1, 2 and, besides, the potential difference (Vo–DB) is set to 200 V to lie nearly at the center.

Examples 1 and 2 satisfied the conditions of the formula (1) but Comparative Examples did not satisfy the conditions of the formula (1).

The photosensitive material (film thickness of 38 μm) was mounted on the copier "Creage 8331" manufactured by Kyocera-Mita Co. The copier was set under the conditions of Table 3, and the endurance print testing of 300,000 copies was conducted using papers of A4-size to compare the stabilities of images.

Figure 11:
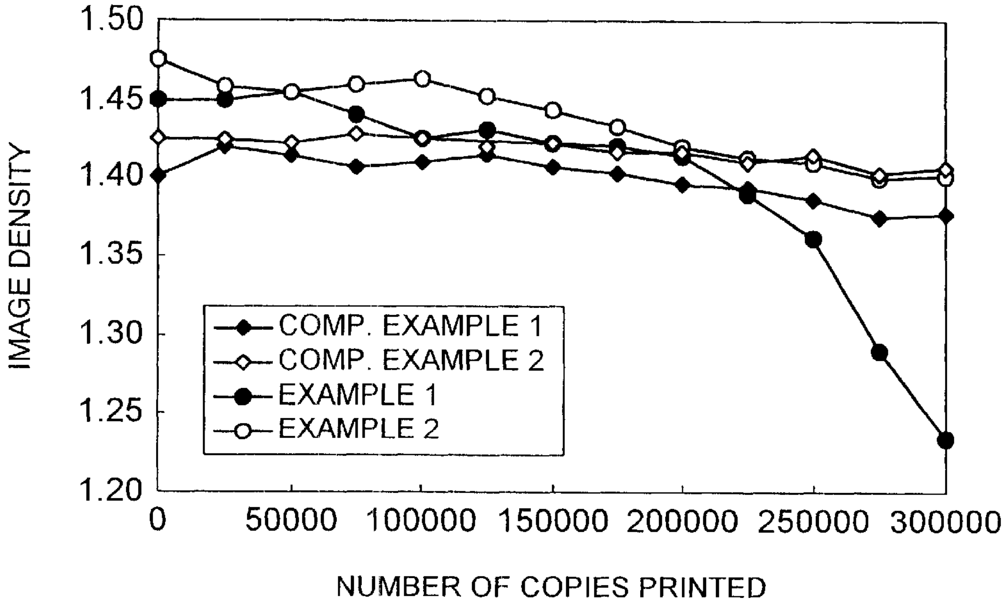
FIG. 11 is a graph illustrating a shift of the image density in the endurance print testing of 300,000 copies.

FIG. 11 is a diagram illustrating the shift of image density in the endurance print testing.

In Comparative Example 1 in which Vo is set to be high (800 V) and the exposure amount is relatively small as shown in FIG. 11, the potential of the exposed portion increases due to a decrease in the film thickness of the photosensitive material. Therefore, the potential difference (DB–Vr) is no longer maintained, and the image density decreases.

In Comparative Example 2 in which the main charged potential (Vo) of the photosensitive material is high but the exposure amount is relatively large, on the other hand, the image density decreases to some extent as the endurance print testing proceeds but is maintained on a high level as a whole This is because the initial setting is such that the potential difference (DB–Vr) is sufficiently maintained, and the image density is favorably maintained despite of a slight increase in the potential (Vr) of the exposed portion.

According to this setting as described with reference to FIG. 1, however, the toner is consumed in large amounts though the image density is not much improved. That is, an increase in the consumption of the toner means an increase in the cost per a copy of image.

In order to avoid the above problem in Examples 1 and 2, the main charged potential (Vo) is lowly set, a minimum degree of potential difference (DB–Vr) is set which is necessary for obtaining a good image density, the main charged potential (Vo) is lowered and the exposure amount is increased to suppress a rise in the potential (Vr) of the exposed portion in the endurance print testing. It is therefore made possible to stably and favorably maintain the image density.

Figure 12:
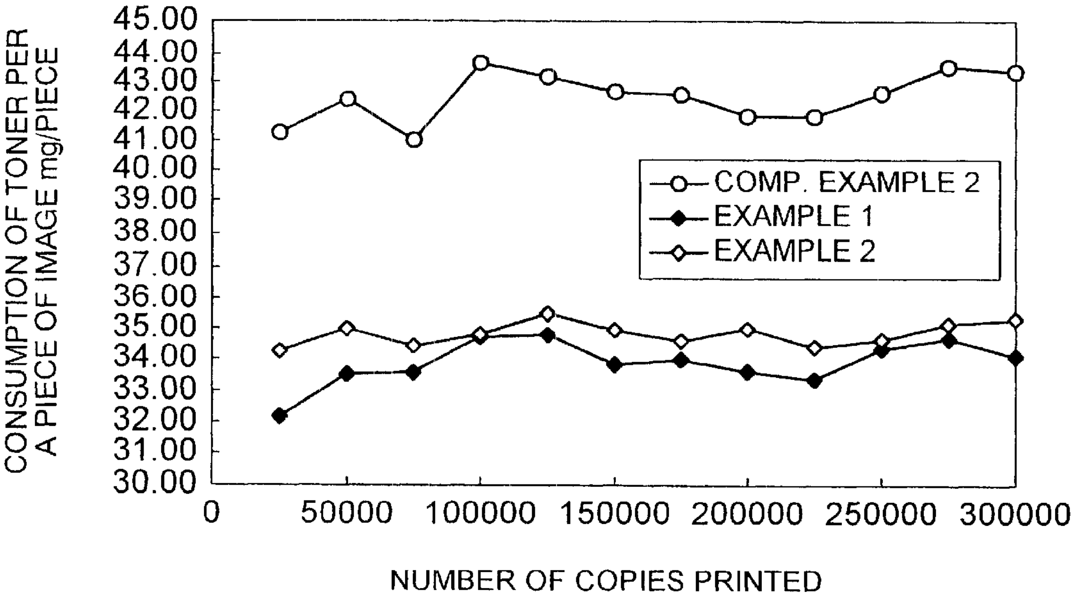
FIG. 12 is a graph illustrating a shift of the consumption of the toner in the endurance print testing of 300,000 copies.

FIG. 12 shows a shift in the amount of the toner used per a piece of image in Comparative Example 2 and in Examples 1 and 2. it will be understood from FIG. 12 that the toner is consumed in Comparative Example 2 in an amount which is larger by about 20% than the consumption in Examples 1 and 2.

In Comparative Example 2, a good image density is obtained for extended periods of time. However, the toner is consumed in large amounts as shown in FIG. 12 resulting in an increase in the cost of copies. In Examples 1 and 2, on the other hand, the consumption of the toner is suppressed, the image density is maintained high, and a favorable image is obtained while suppressing the cost of copies.

According to the present invention, the main charged potential (Vo) of the photosensitive material, the potential (Vr) of the exposed portion of the photosensitive material and the developing bias potential (DB) are so set as to satisfy the above-mentioned formulas (1) and (2), in order to suppress the dependency of the potential (Vr) of the exposed portion upon the film thickness and to maintain favorable electrophotographic characteristics irrespective of a decrease in the thickness of the film caused by abrasion. As a result, the photosensitive material can be used over a wide range of film thickness without using cumbersome means such as correcting the exposure amount, and good image can be formed for extended periods of time.

Moreover, since no means is required such as correcting the exposure amount, the apparatus is simply constructed and at a decreased cost.

Further, since the main charged potential (Vo) of the photosensitive material is relatively low, the amount of electric discharge by the charger can be decreased, the discharge products (NOx, $O_3$) are formed in decreased amounts, and deterioration of the photosensitive material can be suppressed.

Besides, since the amount of discharge is small, the discharge wire needs bear a decreased burden suppressing the formation of abnormal image caused by the deteriorated wire.

What is claimed is:

1. An image-forming apparatus for forming an image by electrically charging a photosensitive material, forming an electrostatic image through the exposure to light and developing the electrostatic image, wherein the main charged potential, Vo, of the photosensitive material, the potential, Vr, of the exposed portion of the photosensitive material and the developing bias potential DB are so set as to satisfy the following formulas (1) and (2), $$V1 \leqq |DB-Vr| \leqq V2 \quad (1)$$

$$V3 \leqq |Vo-DB| \leqq 300 \quad (2)$$

wherein V1, V2 and V3 are parameters calculated from a developing characteristics curve obtained by plotting the image densities to a potential difference between the developing bias potential and the surface potential, 0 V, of the photosensitive material when the image is formed by changing the developing bias potential with the exposure amount being zero in a state where the potential on the surface of the photosensitive material is maintained at zero, V1 being a potential difference, absolute value, at a point at where an approximated straight line A in a region where the image density linearly increases intersects an approximated straight line B in a region where the image density increases to its saturation on the developing characteristics curve;

V2 being a potential difference absolute value, at a point where the approximated straight line B separates away from the developing characteristics curve; and V3 being a potential difference, absolute value, at a point at where the image density exhibits a value of base paper density+0.005.

2. An image-forming apparatus according to claim 1, wherein the main charging potential, Vo, of the photosensitive material and the developing bias potential, DB, are so set as to satisfy the following formula (2'), $$V3+50 \leqq |Vo-DB| \leqq 250 \quad (2').$$

3. An image-forming apparatus according to claim 1, wherein the exposure amount of the exposure device for irradiating the photosensitive material with light is set to be not smaller than 3 times but not larger than 10 times as large as the half exposure amount of the photosensitive material.

4. An image-forming apparatus according to claim 3, wherein the exposure amount of the exposure device for irradiating the photosensitive material with light is set to be not smaller than 4 times but not larger than 6 times as large as the half exposure amount of the photosensitive material.

5. An image-forming apparatus according to claim 1, wherein the photosensitive material is an organic photosensitive material containing a charge-generating agent and a charge-transporting agent.

6. An image-forming apparatus according to claim 5, wherein the developing is effected by the reversal developing system by using a two-component developing agent.

* * * * *